Feb. 8, 1966 J. E. ALBINSON 3,233,902
FOOTBALL TRAINING AID

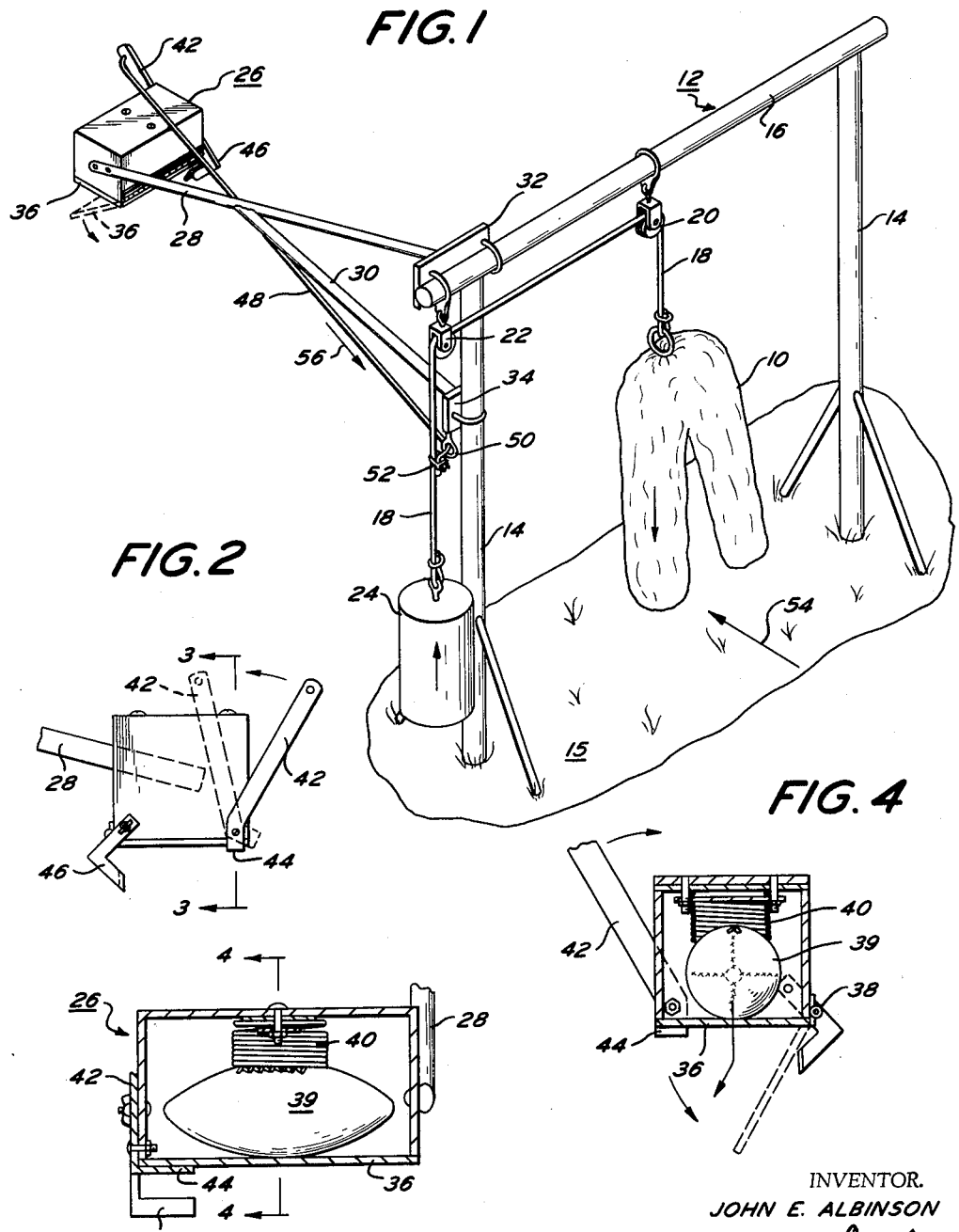

Filed Sept. 30, 1963 2 Sheets-Sheet 2

INVENTOR.
JOHN E. ALBINSON
BY
Millman and Jacobs
ATTORNEY

United States Patent Office 3,233,902
Patented Feb. 8, 1966

3,233,902
FOOTBALL TRAINING AID
John E. Albinson, 315 Lake St., Mount Ephraim, N.J.
Filed Sept. 30, 1963, Ser. No. 312,423
4 Claims. (Cl. 273—55)

This invention relates to training aids for football players and more particularly to such training aids used for tackling purposes and is especially intended for simulating the fumble conditions associated with tackling during football play.

In playing football, a fumble often takes place during the tackling of a ball carrier. The tackling player should be alert to this possibility and respond quickly from the tackle to recover the fumbled football.

Training aids for tackling, such as the conventional tackling dummy or charging sleds are generally effective in teaching a player how to approach a ball carrier to complete the tackling operation. However, it has been found that such training aids are only partly effective and do not teach the tackling player to be alert to fumbles and to recover them. That is, it has been found that the tackling player does not recover quickly from the tackling of the dummy or sled and seek the possible fumble that was created thereby.

Accordingly, it is among the objects of this invention to provide a new and improved football training aid for teaching tackling to football players.

Another object is to provide a new and improved football training aid for simulating the fumble condition during football play.

Another object of this invention is to provide a new and improved football training aid for simulating the fumble condition as it occurs in normal football play and to provide such fumble simulation in conjunction with standard football tackling equipment.

In accordance with this invention, a holder for a football is provided and mounted adjacent to a tackling device, such as the tackling dummy or charging sled. The football holder is connected to the tackling device and arranged to release the football across the path of the tackler as he drives against the tackling device and moves it. Thereby, the tackler acquires the experience of recovering quickly from the tackle and leaping to recover the fumbled football.

The foregoing and other objects of this invention, the features thereof as well as the invention itself, may be more fully understood from the following description when read together with the accompanying drawing, in which:

FIG. 1 is a perspective view of an embodiment of this invention shown in combination with a tackling dummy;

FIG. 2 is an end view of the football holder of FIG. 1 in elevation as seen from the right-hand side of FIG. 1;

FIG. 3 is a sectional view taken on the line 3—3 of FIG. 2;

FIG. 4 is a sectional view taken on the line 4—4 of FIG. 3;

In the drawing, corresponding parts are referenced throughout by the same numerals.

Figure 5:
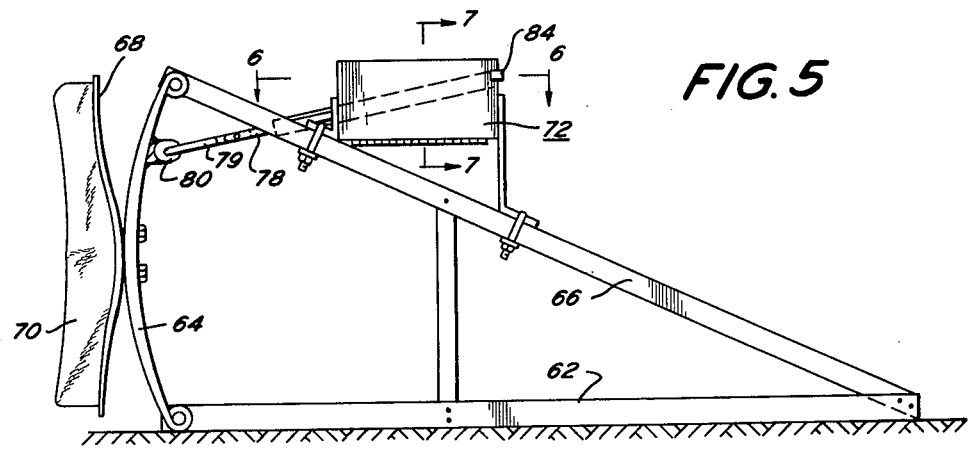
FIG. 5 is a side elevation of another embodiment of this invention used with a charging sled.

In the embodiment of FIGS. 1 to 4, the invention is shown used in connection with a conventional stuffed tackling dummy 10. The latter is suspended from a rack 12 that includes a pair of vertical standards 14 mounted in the ground 15 and having a horizontal cross bar 16 fastened in an appropriate manner to the standards 14. The dummy 10 is suspended by means of a line 18 from a pulley 20 hung from the center of the cross bar 16. The line 18 passes through a second pulley 22 hung from the end of the cross bar 16, and is attached at its other end to a heavy counterweight 24 which may take any suitable form.

A fumbler box 26 is attached at one end to a rigid supporting arm 28 braced by a second arm 30, which arms are respectively attached to brackets 32 and 34. The latter are fastened respectively to the end of the cross arm 16 and to one vertical standard 14 by means of suitable U-bolts. The fumbler box 26 is shown as a rectangular box having a cover 36 for its lower side that is pivoted by means of a suitable hinge 38 along one lower edge thereof.

Attached inside the box to the opposite upper side of the box is a coil spring 40 mounted centrally within the box. The box is dimensioned to retain a football 39 therein between the cover 36 and the spring 40 with the spring in compressed condition. The cover 36 is retained in its closed position by means of a releasable latch having a pivoted lever arm 42 and a finger 44 bent under the free edge of the cover 36. At the pivoted end of the cover 36, an adjustably positioned stop 46 is provided, which is adjustably positioned by means of a pivot attached to one end wall of the box 26. The stop 46 determines the angle to which the cover 36 opens (FIG. 4), so that it functions as a deflector of the football as it drops out of the box; thereby, the cover 36 is effective to direct the football in a desired direction and at a desired angle.

The lever arm 42 is attached, by means of a hole in the upper end thereof, to a line 48. The latter passes from the end of the lever 42, through an eyelet guide 50 attached to the bracket 34, to a line clamp 52 by means of which it is securely fastened to an intermediate portion of the dummy line 18. Additional eyelet guides may be provided on the arm 28 or 30 to ensure smooth and reliable movement thereof.

During football practice, a tackler approaches the dummy 10 along a path represented generally by the arrow 54. The tackler drives hard against the dummy and pulls it down as he continues to drive forward. The line 18 is pulled with the dummy 10, and the counterweight 24 is pulled up (indicated by the arrow thereon), as it is moved with the line 18.

The end of the line 48 attached to the clamp 52 likewise moves with the line 18, and the line 48 is pulled in the direction of the arrow 56 to actuate the lever arm 42 in the direction shown by the arrows in FIGS. 2 and 4 to release the latching finger 44 from the cover 36, as shown in broken lines in FIG. 2. When the cover 36 is so released, the football 39 is impelled downward by the spring 40, which is under compression, through the open bottom of the box and is deflected by the open cover 36 in a direction away from the standards 14 and generally across the path of the tackler. The spring 40 ensures that the ball does not merely drop, as a dead ball would, but impels the ball in a lively fashion like a fumble originating from a hard tackle.

The tackler, thereby, has the incentive as well as the responsibility to recover quickly from the tackle of the dummy 10 and to seek the fumbled football to recover it. By providing sufficient slack in the line 48 and by attaching the clamp 52 at a suitable point along the line 18, an adjustment is provided for the time of release of the football 39. That is, the amount of movement of the dummy 10 during the tackle that is required to actuate the latch 42 and release the football 39 can be adjusted. Thereby, a football coach can control, during training, the intensity of the tackle that is needed for a player to release the football in a simulated fumble. The point of attachment of line clamp 52 determines whether a light or a heavy tackle produces a fumble. The player has the incentive of a hard tackle in order to ensure operation of the fumbler box and to produce a fumble.

When the football is recovered, it is readily reinserted in the box 26, the cover is closed, and the latch finger 44 is readily reapplied to the cover. The equipment is then ready for the next player's tackle.

Figure 6:
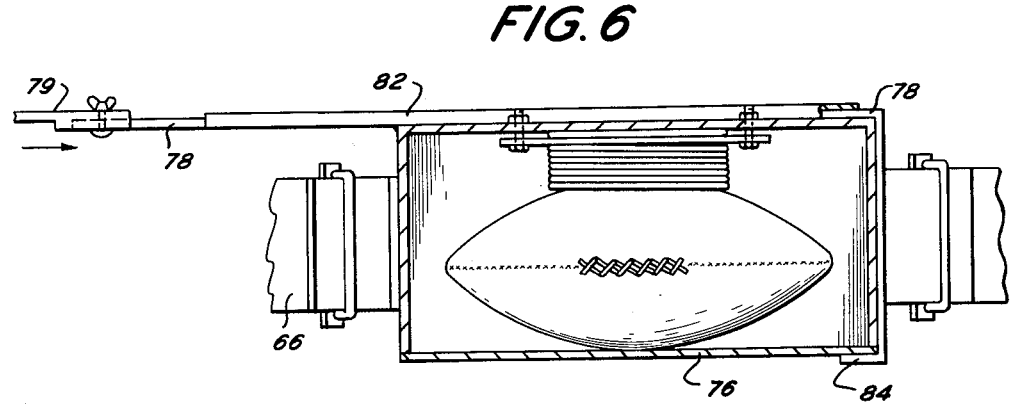
FIG. 6 is a sectional view taken on the line 6—6 of FIG. 5.
Figure 7:
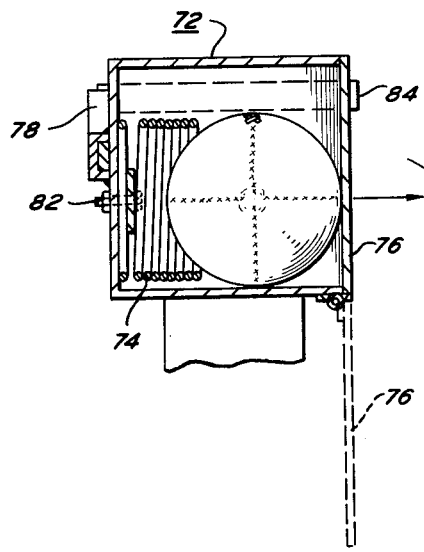
FIG. 7 is a sectional view taken on the line 7—7 of FIG. 5.

In FIGS. 5 to 7, the tackling device is in the form of a charging sled 60 having a pair of ground-engaging members 62 (only one of which is shown) that are connected together, for example, by cross members (not shown) to form a suitable platform. A large and relatively heavy leaf spring 64 is attached between the front end of the member 62 and the end of a second member 66, which is attached at its other end to the rear end of the ground-engaging member 62. In a two-man sled, two such springs and cushions are provided, side by side, on the same frame and platform. Bolted to the central portion of the leaf spring 64 is a member 68 having its front face suitably cushioned by a pad 70.

A fumbler box 72 has its ends attached by brackets to the member 66, and is constructed in a manner somewhat similar to the box 26 described above. A coil spring 74 is fastened to one side of the box, and a pivoted cover 76 is provided on the opposite side. The cover 76 is latched in ball-holding position by means of a bail formed as two members 78 and 79 that are adjustably fastened together along their length. The member 79 is positioned at one end adjacent to and between the bifurcated fingers of a bracket 80 fastened to the spring 64; the other end of member 79 is fastened to member 78 so that the overall length can be adjusted. Bail 78 passes through a channel guide member 82 to the opposite end of the box 72 where the bail 78 is bent around that end of the box and has a latching finger 84 that retains the cover 76 in closed condition. Under normal conditions the end of bail 79 is not in contact with bracket 80.

This embodiment operates in a manner similar to that described above when the cushion 70 of the charging sled is hit by a tackler. With the bending of the spring 64 beyond a certain amount, the bracket 80 engages the bail member 79 and moves the bail 79, 78 to actuate the latch finger 84. As a result, the cover 76 is released, and the spring 74 impels the football sideways out of the box and free of the sled, but generally in the path of the tackler hitting the sled. The football is then reinserted in the box 72, and the cover is latched in position. The free end of bail member 79 permits the latching to be independent of the condition of spring 64. The adjustability of the ball length permits the coach to control the intensity of the tackle that is required to release the football in a fumble. That is, the amount of bending of the spring 64 that is required to actuate the latch 84 depends on the position of the free end of bail member 79, which in turn is set by the relative adjustment of the overall length of members 78 and 79.

In each of the embodiments of the invention, the football is released across the path of the tackler, but generally away from any equipment that is being used so that there is no danger of a player running against any of the equipment that may cause injury. In the embodiment of FIG. 1 the box may be oriented so that the ball is released sideways in a manner similar to that of FIG. 5. The release of the football is effective to simulate the erratic, lively movement of a football under fumbled conditions, and in each case the tackler has to recover quickly from the tackle and seek the fumbled football.

Various modifications of this invention may be made within its spirit, and the fumbler box of this invention may be used with any appropriate tackling equipment. The fumbler box is mounted adjacent to the tackler equipment, and the football is released from the box in a direction away from the tackling equipment in order to avoid any danger of the player hitting that equipment in his eagerness to catch the ball. The ball may be released downward from the box or sideways as shown in the embodiments of the invention, and the direction of release may be adjusted by using the cover to deflect the ball.

Though a box has been shown as a simple and effective means for holding the ball and for providing a release of the ball under appropriate conditions, other means for holding the ball may be provided; for example, a complete enclosure of the ball is not necessary, an open framework may be used instead, since the football need only be retained, for example, by holding it on opposite surfaces. Moreover, the impeller may be latched, instead of using a cover, and the latch released to impel the football out of the holder. For example, in FIG. 7 the spring 74 may be latched in compressed condition (the cover 76 is then unnecessary); and when the tackle is made, the spring is unlatched to drive the ball out of the box.

This invention may also be used for small children as well as for youths. That is, the tackling equipment, such as the dummy, may be made in relatively small size and the fumbler used to lend interest to the play of the child in tackling the dummy. By way of example, the fumbler and tackling dummy arrangement of FIG. 1 may be modified for a toy apparatus by arranging the dummy rack in the form of football goal posts; i.e. with two upright standards and an intermediate cross bar. The dummy is suspended from the cross bar, and the fumbler is attached to the cross bar or vertical standards and extends in back of the goal posts. In other respects the operation and construction of the system is generally the same as that shown in FIG. 1. In this arrangement the toy functions in various ways, namely, for kicking practice, tackling practice, and tackling practice together with the fumbler incentive. Under such circumstances, as well as in the embodiment of FIG. 1, the fumbler box is positioned sufficiently high to be out of the way of the running child, and at the same time sufficiently low to be within easy reach of the child to set up the football in the box.

Thus, in accordance with this invention, a new and improved football training aid has been provided which assures additional incentives to players in training for following the instructions of the coach during tackling training. The device is effective to simulate a fumble during the tackling operation, and the coach is enabled to guide the tackler in this training operation as well as to measure the effectiveness of the tackling.

What is claimed is:

1. A football training aid for simulating a fumble and adapted for use with tackling equipment having a movable part that is operated by a tackling player, comprising means for holding a football and for releasing said football therefrom, means for linking said holding and releasing means to said tackling equipment and responsive to a predetermined movement thereof for initiating the release of said football from said holding means, said holding and releasing means including means for impelling said football from said holding means, said linking means being connected to initiate the impelling of said football responsive to movement of said tackling equipment and being adjustable to be responsive to different movements of said tackling equipment.

2. A football training aid for simulating fumbles comprising a tackling training device having a part that is tackled by a player as he approaches the device along a certain path, and a movable part that is moved during the tackling operation; means mounted adjacent to said tackling device for holding a football, said holding means including a container having a spring and a movable member, said container being dimensioned to hold said football between said member and spring with spring under compression, and a movable latch for said member in football holding position; and means connected between said latch and said movable tackling part for actuating said latch and the release of said football, said movable member being so positioned and movable in such a direction that the football is released generally along the path of the player and away from said tackling device.

3. A football training aid as recited in claim 2 wherein said tackling device includes a tackling dummy and a line for suspending said dummy, and said actuating means includes a line connected between said dummy line and said latch.

4. A football training aid as recited in claim 3 wherein said tackling device includes a charging sled, and said actuating means includes a member positioned to be actuated after a predetermined movement of said movable part.

References Cited by the Examiner

UNITED STATES PATENTS

| | | | |
|---|---|---|---|
| 2,767,985 | 10/1956 | Maxcey | 273—55 |
| 2,940,757 | 6/1960 | Britt | 273—55 |
| 3,044,776 | 7/1962 | Weldmaier et al. | 273—55 |

RICHARD C. PINKHAM, *Primary Examiner.*